US009891805B2

(12) United States Patent
Matsuda

(10) Patent No.: US 9,891,805 B2
(45) Date of Patent: Feb. 13, 2018

(54) MOBILE TERMINAL, AND USER INTERFACE CONTROL PROGRAM AND METHOD

(71) Applicant: KYOCERA Corporation, Fushimi-ku, Kyoto-shi (JP)

(72) Inventor: Munehito Matsuda, Neyagawa (JP)

(73) Assignee: KYOCERA Corporation, Kyoto (JP)

( * ) Notice: Subject to any disclaimer, the term of this patent is extended or adjusted under 35 U.S.C. 154(b) by 397 days.

(21) Appl. No.: 14/654,487

(22) PCT Filed: Dec. 20, 2013

(86) PCT No.: PCT/JP2013/084190
§ 371 (c)(1),
(2) Date: Jun. 19, 2015

(87) PCT Pub. No.: WO2014/098207
PCT Pub. Date: Jun. 26, 2014

(65) Prior Publication Data
US 2015/0339044 A1 Nov. 26, 2015

(30) Foreign Application Priority Data
Dec. 21, 2012 (JP) .................................. 2012-279168

(51) Int. Cl.
*G06F 3/0487* (2013.01)
*G06F 3/0484* (2013.01)
(Continued)

(52) U.S. Cl.
CPC .......... *G06F 3/04847* (2013.01); *G06F 3/016* (2013.01); *G06F 3/0482* (2013.01);
(Continued)

(58) Field of Classification Search
CPC ............ G06F 3/04847; G06F 3/04817; G06F 3/04842; G06F 3/0482; G06F 3/0488
See application file for complete search history.

(56) References Cited

U.S. PATENT DOCUMENTS

2007/0220444 A1\* 9/2007 Sunday ................. G06F 3/0488
715/788
2010/0302172 A1\* 12/2010 Wilairat .............. G06F 3/04883
345/173

(Continued)

FOREIGN PATENT DOCUMENTS

JP 2009-163278 A 7/2009
JP 2010-268336 A 11/2009

(Continued)

OTHER PUBLICATIONS

International Search Report dated Mar. 25, 2014 issued in counterpart International Application No. PCT/JP2013/04190.
Office Action dated Mar. 7, 2017 issued by the Japan Patent Office in counterpart Japanese Application No. 2016-133083 with concise explanation, 5 pages.

*Primary Examiner* — Anil Bhargava
(74) *Attorney, Agent, or Firm* — Procopio Cory Hargreaves and Savitch LLP

(57) ABSTRACT

A mobile terminal (10) has the touch screen TS capable of displaying an object Ob. A CPU (24) of the mobile terminal determines (S1, S3, S21), when an operation that is slid from an end of a touch screen TS to an inner side is performed, that the operation is a specific slide operation, and corresponding to determination of the specific slide operation, displays (S27, S35) a function icon FI related to a user interface function such as a cursor and an voice input in an area that can be touched in the specific slide operation to the touch screen TS afterward. Then, the CPU starts (S37, S39, S43, S59) the interface function related to the function icon FI when a present touch position PTP of the specific slide operation enters in a display area of the function icon FI.

19 Claims, 10 Drawing Sheets

(51) Int. Cl.
  *G06F 3/0481* (2013.01)
  *G06F 3/01* (2006.01)
  *G06F 3/16* (2006.01)
  *G06F 3/0488* (2013.01)
  *G06F 3/0482* (2013.01)

(52) U.S. Cl.
  CPC ........ *G06F 3/0488* (2013.01); *G06F 3/04817* (2013.01); *G06F 3/04842* (2013.01); *G06F 3/04883* (2013.01); *G06F 3/167* (2013.01)

(56) References Cited

U.S. PATENT DOCUMENTS

| | | | | |
|---|---|---|---|---|
| 2011/0209093 | A1* | 8/2011 | Hinckley | G06F 3/04817 715/834 |
| 2012/0192108 | A1* | 7/2012 | Kolb | G06F 3/0482 715/810 |
| 2013/0244574 | A1* | 9/2013 | Okuno | H04M 1/67 455/26.1 |

FOREIGN PATENT DOCUMENTS

| | | |
|---|---|---|
| JP | 2010-049679 A | 3/2010 |
| WO | 2012/111262 A1 | 8/2012 |
| WO | 2012/128296 A1 | 9/2012 |
| WO | 2012/160920 A1 | 11/2012 |

* cited by examiner

FIG. 4
(SELECTION OF CURSOR FUNCTION → APPEARANCE OF CURSOR →
SELECTION OF OBJECT, BY CONTINUATION OF SPECIFIC SLIDE OPERATION)
(A) 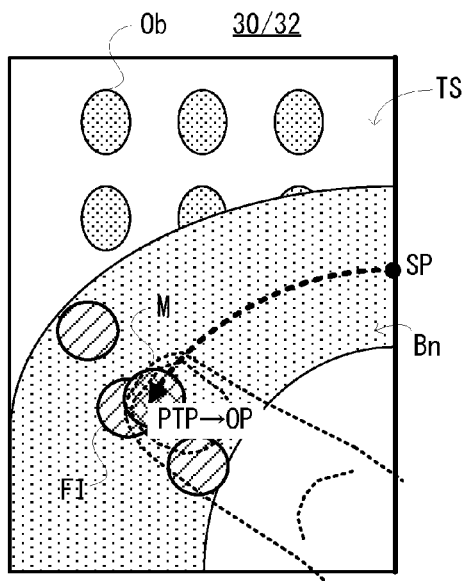
(B) 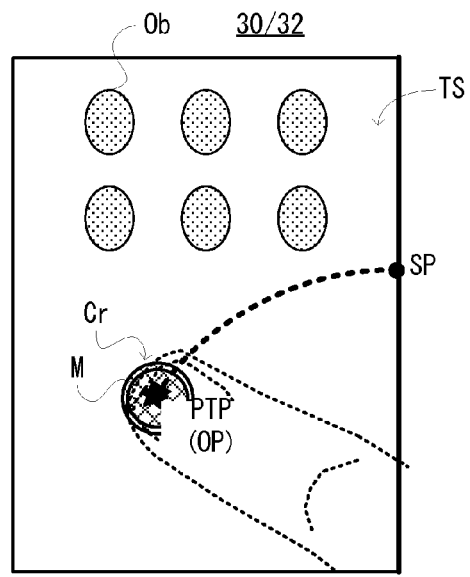
(C) 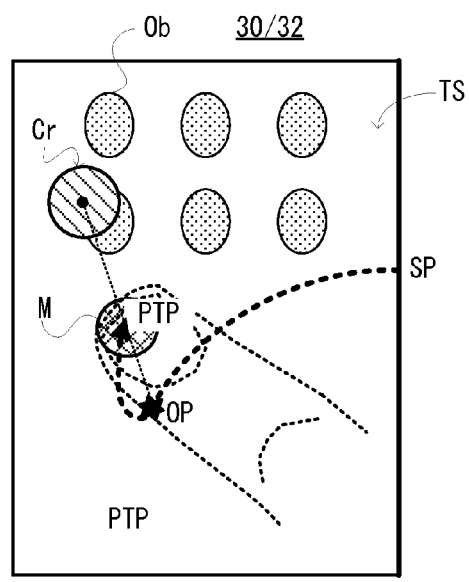

FIG. 5
(DISPLAY POSITION OF FUNCTION ICON, CHANGED ACCORDING TO START POINT OF SPECIFIC SLIDE OPERATION)
(A) 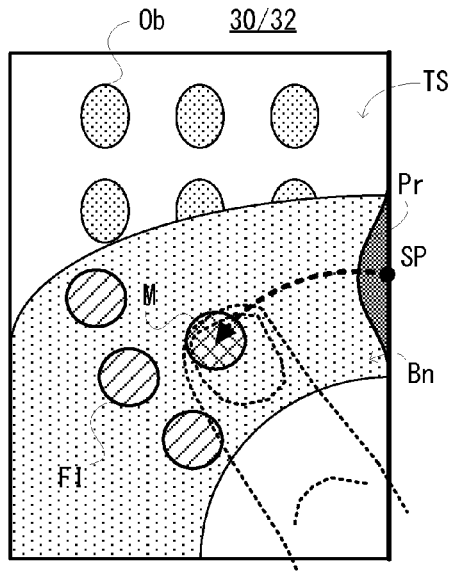
(B) 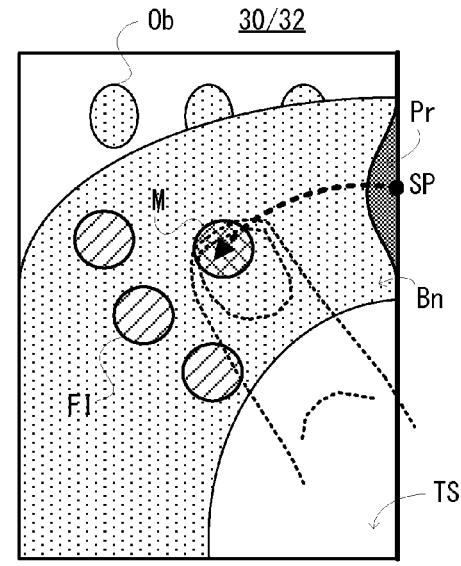
FIG. 6 (DEFORMATION OF PROTRUSION ACCORDING TO SLIDE DIRECTION)
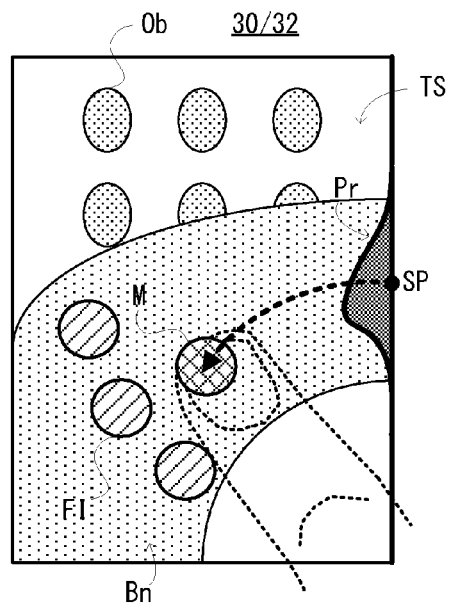

(SLIDE OPERATION FROM LEFT END PORTION)

(HORIZONTALLY HOLDING)

| FUNCTION ICON | DISPLAY POSITION | DISPLAY SIZE |
|---|---|---|
| CURSOR | (x1, y1) | R1 |
| VOICE INPUT | (x2, y2) | R2 |
| LOUPE | (x3, y3) | R3 |

MOBILE TERMINAL, AND USER INTERFACE CONTROL PROGRAM AND METHOD

CROSS REFERENCE TO RELATED APPLICATION

The disclosure of priority Japanese patent application No. 2012-279168 filed on Dec. 21, 2012 is incorporated herein by reference in its entirety.

FIELD

The present disclosure relates to a mobile terminal and a user interface control program and method, and more specifically, a mobile terminal having a touch screen capable of displaying an object such as an icon, a widget, etc., and a program and method of controlling a user interface.

BACKGROUND

In such a kind of conventional mobile terminal, an object is displayed in a periphery of a corner (lower right corner, for example) of a touch screen.

However, in the above-mentioned background art, since an object exists near the corner of the touch screen, when intending to hold and operate the mobile terminal with a single hand (one hand), it is necessary to have a finger bend or stretch forcibly, or to change a holding position of the hand. That is, this kind of conventional mobile terminal has a problem that it is hard to hold and operate by a single hand.

SUMMARY

A first aspect of the present disclosure is a mobile terminal, comprising: a touch screen capable of displaying an object; a determining module operable to determine, when an operation of sliding from an end portion of the touch screen to an inner side of the touch screen is performed, that the operation is a specific slide operation; and an icon display module operable to display, in response to determination of the specific slide operation by the determining module an icon related to a user interface function in an area that the icon can be touched by the specific slide operation to the touch screen afterward.

A second aspect of the present disclosure is a user interface control program that causes a processor of a mobile terminal having a touch screen capable of displaying an object to function as: a determining module operable to determine, when an operation of sliding from an end portion of the touch screen to an inner side of the touch screen is performed, that the operation is a specific slide operation; and an icon display module operable to display, in response to determination of the specific slide operation by the determining module an icon related to a user interface function in an area that the icon can be touched by the specific slide operation to the touch screen afterward.

A third aspect of the present disclosure is a user interface control method performed by a mobile terminal having a touch screen capable of displaying an object, comprising steps of: determining, when an operation of sliding from an end portion of the touch screen to an inner side of the touch screen is performed, that the operation is a specific slide operation; and displaying, in response to determination of the specific slide operation in the determining step an icon related to a user interface function in an area that the icon can be touched by the specific slide operation to the touch screen afterward.

The above mentioned objects and other objects, features, aspects and advantages of the invention will become more apparent from the following detailed description of the invention when taken in conjunction with the accompanying drawings.

BRIEF DESCRIPTION OF THE DRAWINGS

FIG. 3 illustrates an example of an animation that a function icon is discharged from an end portion (screen end portion) of a touch screen by the specific slide operation, wherein FIG. 3(A) shows a display immediately after the specific slide operation is started, FIG. 3(B) shows a display at the time that a displacement amount in a horizontal direction of the specific slide operation reaches a threshold value, FIG. 3(C) shows a display immediately after the displacement amount exceeds the threshold value (a manner that the function icon is discharged from the screen end portion), and FIG. 3(D) shows a display after the function icon is discharged from the screen end portion.

FIG. 4 illustrates continuance of FIG. 3(D), wherein FIG. 4(A) shows a display just before a "cursor" icon that is one of function icons is selected by continuation of the specific slide operation, FIG. 4(B) shows a display at the time that the "cursor" icon is selected and thus a cursor appears, and FIG. 4(C) shows a display just before the cursor is moved by further continuation of the specific slide operation to select one of objects.

FIG. 5 illustrates a display position of the function icon that is changed according to a start point of the specific slide operation, wherein FIG. 5(A) shows a case where the start point is located in the middle of a right end portion of the screen, and FIG. 5(B) shows a case where the start point is located in an upper side of the right end portion of the screen.

FIG. 6 is an illustration view showing an example that a protrusion due to the specific slide operation in the screen end portion is deformed according to a slide direction.

DETAILED DESCRIPTION

Figure 1:
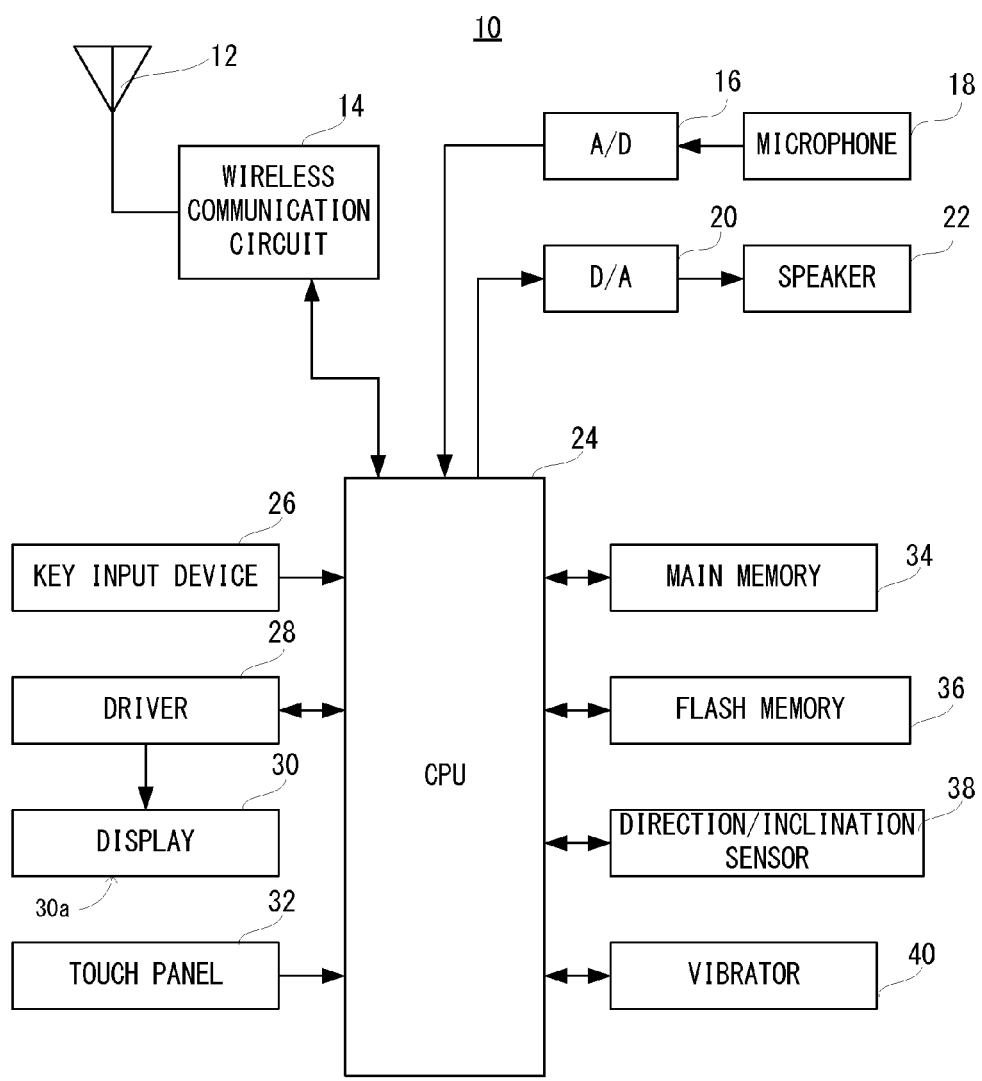
FIG. 1 is a block diagram showing structure of a mobile terminal that is an embodiment of the present disclosure.

Hardware structure of a mobile terminal 10 is shown in FIG. 1. With reference to FIG. 1, the mobile terminal 10 that is an embodiment of the present disclosure includes a CPU 24. The CPU 24 is connected with a key input device 26, a touch panel 32, a main memory 34, a flash memory 36, a direction/inclination sensor 38 and a vibrator 40, and further with an antenna 12 via a wireless communication circuit 14, a microphone 18 via an A/D converter 16, a speaker 22 via a D/A converter 20 and a display 30 via a driver 28.

The antenna 12 can receive a radio wave signal from a base station not shown. Furthermore, the antenna 12 can transmit a radio wave signal from the wireless communication circuit 14. The wireless communication circuit 14 can demodulate and decode a radio wave signal received by the antenna 12, and can encode and modulates a signal from the CPU 24. The microphone 18 can convert a sound wave into an analog voice signal, and the ND converter 16 can convert a voice signal from the microphone 18 into digital voice data. The D/A converter 20 can convert voice data from the CPU 24 into an analog voice signal, and the speaker 22 can convert a voice signal from the D/A converter 20 into a sound wave.

The key input device 26 may be constituted by various kinds of keys, buttons (not shown), etc. operated by a user (operator), and can input a signal (command) corresponding to an operation into the CPU 24. The driver 28 can display an image corresponding to a signal from the CPU 24 on the display 30. The touch panel 32 may be provided on a display surface 30a of the display 30, and can input into the CPU 24 a signal (X, Y coordinates: see FIG. 2) indicating a position of a touch point. Hereinafter, a screen capable of displaying an object such as an icon, a widget etc. in the display surface 30a of the display 30 provided the touch panel 32 is called a "touch screen TS".

The main memory 34 may be constituted by an SDRAM, etc., for example, and can store programs for making the CPU 24 perform various kinds of processing, data, etc. (see FIG. 9), and can provide a working area required for the CPU 24. The flash memory 36 may be constituted by a NAND type flash memory, for example, and can be utilized as a saving area of the program etc. or a recording area of data of an image etc.

The direction/inclination sensor 38 may be constituted with a gyroscope, an acceleration sensor, etc., and can input to the CPU 24 data representing a direction (distinction of vertically holding or horizontally holding, for example) and an inclination (angle of inclination of the display surface 30a of the display 30 to the horizontal surface, for example), etc. of the mobile terminal 10. The vibrator 40 may be constituted with am eccentricity motor etc., and can vibrate the mobile terminal 10 according to instructions from the CPU 24.

The CPU 24 can perform various kinds of processing according to programs (52-56) stored in the main memory 34 while utilizing other hardware (12-22, 26-38).

Figure 2:
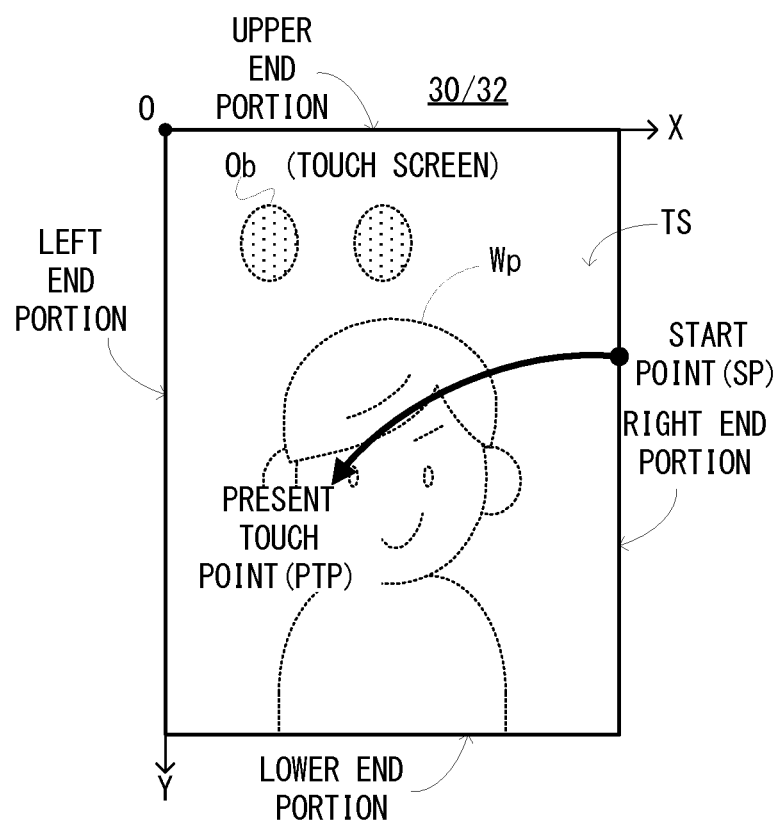
FIG. 2 is an illustration view showing an example of a specific slide operation performed to a display screen (touch screen) of a display that is provided with a touch panel.
Figure 3:
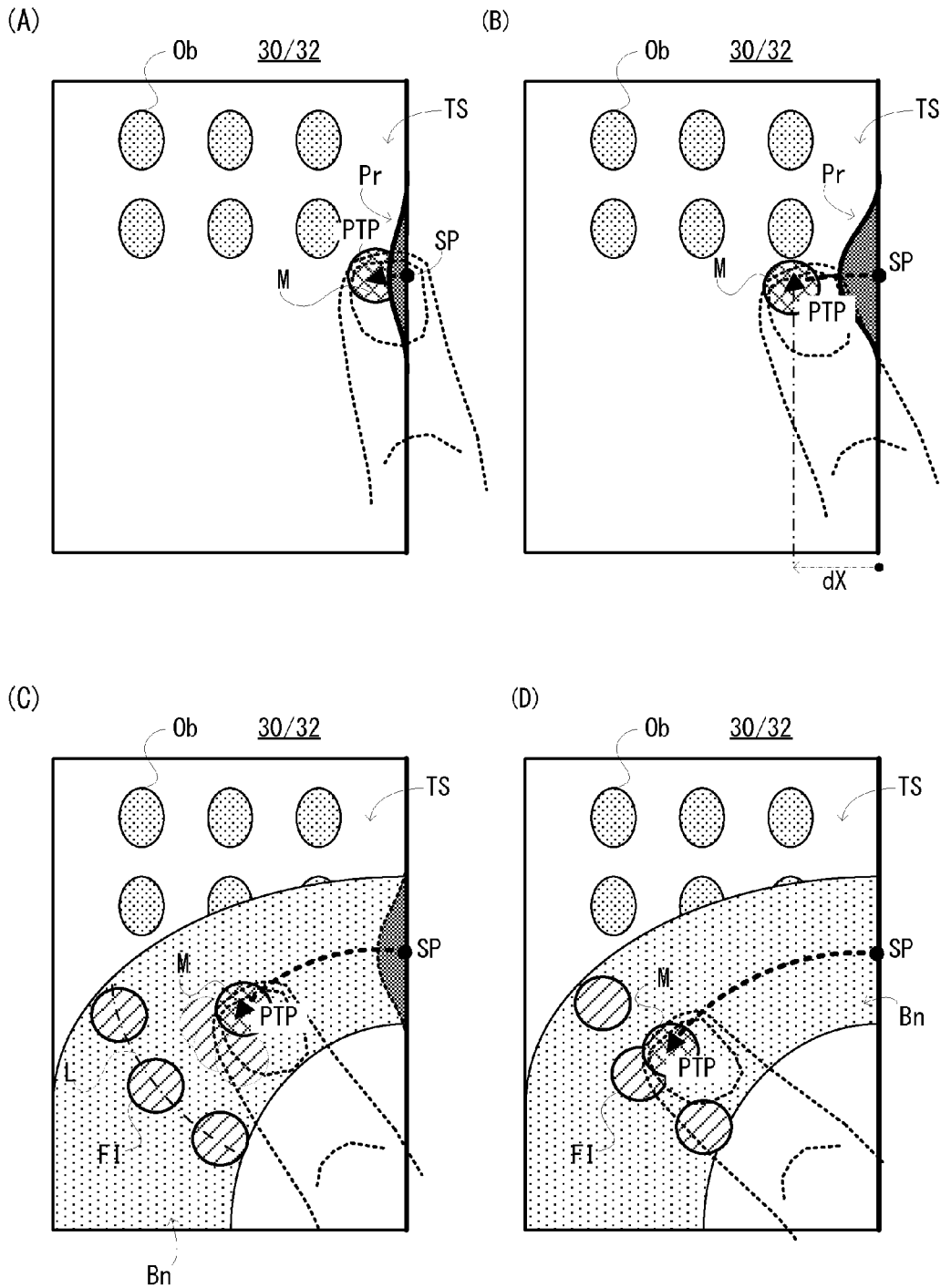

In the mobile terminal 10 constituted as mentioned above, it is possible to select various kinds of applications such as a telephone application for performing a telephone calling and a browser application for performing browse of a Web page through the touch screen TS as shown in FIG. 2, for example.

Specifically, in the touch screen TS, various kinds of objects (an icon and a widget) Ob related to the telephone application or data communication application may be arranged on a background (wallpaper such as a portrait photograph) Wp, and by performing a touch operation to any one of the objects Ob, a desired application can be selected, thereby to perform the telephone calling or the data communication.

If the telephone application is selected, the mobile terminal 10 displays a screen for performing a telephone calling on the display 30. If a number input is performed by the touch panel 32, the CPU 24 controls the wireless communication circuit 14, and outputs a calling signal. The calling signal that is output is transmitted via the antenna 12 to be transferred to a telephone at the other end of line through a mobile communication network not shown. The telephone at the other end of line starts a call by a ringer tone, etc. If a person who receives an incoming call performs a receiving operation to the telephone at the other end of line, the CPU 24 starts telephone conversation processing. On the other hand, if a calling signal from a telephone at the other end of line is captured by the antenna 12, the wireless communication circuit 14 notifies an incoming call to the CPU 24, and the CPU 24 starts a call by a ringer tone from the speaker 22, vibration of the vibrator 40, etc. If a receiving operation is performed by the key input device 26, the CPU 24 starts telephone conversation processing.

The telephone conversation processing is performed as follows, for example. A receiving voice signal sent by the telephone at the other end of line is captured by the antenna 12 and applied to the speaker 22 through the D/A converter 20 after subjected to demodulation and decode by the wireless communication circuit 14. Accordingly, a receiving voice is output from the speaker 22. On the other hand, a sending voice signal taken-in by the microphone 18 is sent to the wireless communication circuit 14 through the ND converter 16, and is transmitted to the telephone at the other end of line through the antenna 12 after subjected to encode and modulation by the wireless communication circuit 14. Also in the telephone at the other end of line, demodulation and decode of the sending voice signal are performed to output a sending voice.

If the browser application is selected, the mobile terminal 10 displays a screen for browsing a Web page on the display 30. In detail, if an address input operation is performed by the touch panel 32, the CPU 24 controls the wireless communication circuit 14 to connect to a network (not shown), and receives an HTML document from a Web server (not shown) corresponding to the input address. Then, the CPU 24 controls the driver 28 to display the Web page based on the HTML document on the display 30.

In the mobile terminal 10 constituted as mentioned above, operability suitable for a single hand (comfortable one-hand operation) is realized by a characteristic GUI (Graphical User Interface). In this GUI, a slide operation with a start point SP on a screen end portion (a right end portion, a left end portion, a upper end portion or lower end portion), called "specific slide operation" as shown in FIG. 2 is used.

Specifically, although a user mainly operates the touch screen TS with the right thumb when holding the mobile terminal 10 vertically with the right hand, since the root of the thumb is located in the lower right of the touch screen TS at this time, it is natural that a motion of the tip end of the thumb (present touch point PTP) goes below left diagonally from the start point SP on the right end portion of the touch screen TS, preferably along a circumstance centering on the root of the thumb.

That is, the specific slide operation at the time of vertically holding the mobile terminal 10 with the right hand draws a locus that goes below left diagonally from the start point SP on the right end portion of the touch screen TS. Similarly, the specific slide operation at the time of vertically holding with the left hand draws a locus that goes below right diagonally from the start point SP on the left end portion of the touch screen TS. Therefore, in performing the specific slide operation, a user has little necessity of adopting a special way of holding, bending or stretching a finger forcibly, or changing a holding position on the way.

Figure 7:
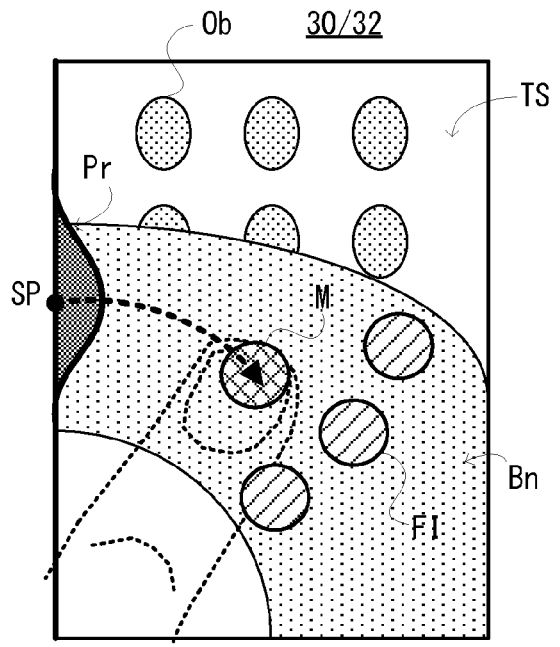
FIG. 7 is an illustration view showing an example of icon discharge by the specific slide operation from a left end portion of a screen.
Figure 8:
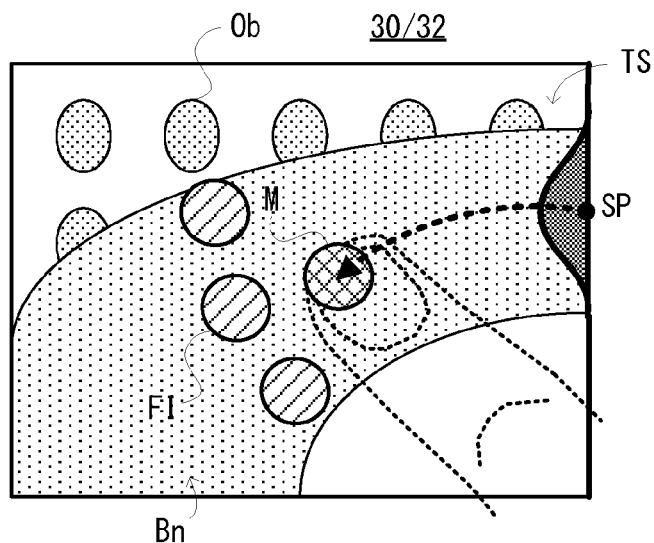
FIG. 8 is an illustration view showing an example of icon discharge at the time of holding the mobile terminal horizontally.

The GUI control in a case where a desired application is selected using such the specific slide operation is as in FIG. 3-FIG. 8, for example. The touch screen TS in a case of vertically holding with the right hand is shown in FIG. 3-FIG. 6, the touch screen TS in a case of vertically holding with the left hand is shown in FIG. 7, and the touch screen TS in a case of horizontally holding with the right hand is shown in FIG. 8. Furthermore, a coordinate system that renders an upper left corner of the screen an origin point O (X, Y) as shown in FIG. 2, for example is defined for the touch screen TS.

First, with reference to FIG. 3(A)-FIG. 3(B), if a fingertip is brought into contact to the right end portion of the touch screen TS and then starts to move just laterally or toward below diagonally while being in contact state (displacement in an X direction is detected), the CPU 24 determines it as a start of the specific slide operation, and while displays a mark M that shows the present touch point PTP, starts an animation showing that a periphery of the start point SP in the right end portion is protruded temporarily and a function icon FI (mentioned later) is discharged from a protrusion Pr of the right end portion.

In displaying the mark M, it is preferable to change periodically at least one of a display size and transmissivity so as not to become hard to see wallpaper Wp.

Next, with reference to FIG. 3(B)-FIG. 3(C), when a displacement amount (dX) in the X direction of the specific slide operation reaches a threshold value (1/10 of a breadth of the touch screen TS, for example), the protrusion Pr of the right end portion becomes maximum, then one or more (here, three pieces) function icons FI are discharged from this protrusion Pr of the right end portion. In addition, it may be added the direction that the number of the function icons is one (1) when discharged from the protrusion Pr and the function icon is divided into a plural number of pieces on the way. More preferably, a translucent belt Bn including a locus of the function icon FI may be displayed in order to make jumping of the function icon FI be emphasized or legible. Furthermore, the three function icons FI are arranged along a line segment L (for example, a part of a circumference having a radius of approximately a half of a diagonal line of the touch screen TS with a center at the start point SP) that intersects (for example, perpendicularly) a locus of the specific slide operation.

Furthermore, at a timing that the function icon FI is thus discharged, a sound effect such as "POM" may be output from the speaker 22 and the vibrator 40 may vibrate for 1/several seconds. By thus generating the sound and vibration in conjunction with the animation display, it is possible to give a user reality that the function icon FI is discharged through a sense of sight, hearing sense and tactual sense. An effect increasing a feeling of discharge can be obtained by only at least one of the sound and the vibration.

Next, with reference to FIG. 3(C)-FIG. 3(D), after the function icon FI is discharged, the protrusion Pr in the right end portion damps and disappears. The function icon FI being discharged moves to a predetermined position with respect to the start point SP along the circumference centering on the root of the thumb, and then, stops at that position to be displayed.

Therefore, the function icon FI is displayed (displayed while being moved, and then, stopped while being displayed) in an area that the user can touch in the specific slide operation afterward (an inside of the display area of the belt Bn, for example). Otherwise, it may be rephrased that the function icon FI is displayed in a direction that it is predicted that the present touch point PTP of the specific slide operation advances (this may be simply called "direction of the specific slide operation").

Next, with reference to FIG. 3(D)-FIG. 4(A), if the present touch point PTP of the specific slide operation enters in a display area of any one of the function icons FI, the CPU 24 determines that the function icon FI is selected, and starts the function related thereto. Here, three function icons in the touch screen TS are a "voice input", a "cursor" and a "loupe" sequentially from the upper left, and it is supposed that the "cursor" icon in the middle is selected.

Next, with reference to FIG. 4(A)-FIG. 4(B), if a cursor function is started in response to selection of the "cursor" icon, the three function icons FI are non-displayed along with the belt Bn, and a cursor Cr of the same or approximately the same size as that of the mark M (here, slightly larger than the mark M) appears in a position of the present touch point PTP. Otherwise, it may be performed the direction that the function icon being selected, i.e., the "cursor" icon is changed to a "cursor Cr" and move this to the position of the present touch point PTP, while non-displaying the function icons FI except the icon having been selected along with the belt Bn.

Thus, although the cursor Cr is displayed on the same position as the mark M initially, since the size or transmissivity of the mark M changes periodically, identification of the both is possible. A display manner of the mark M and the cursor Cr mentioned here is an example, and may be changed suitably. For example, the identification becomes easier if forms and displaying colors of the both are changed.

Next, with reference to FIG. 4(B)-FIG. 4(C), the above-mentioned initial display position of the cursor Cr is stored as a cursor origin point OP. Then, if the specific slide operation is continued and the present touch point PTP leaves the cursor origin point OP, the cursor Cr moves corresponding to the position of the present touch point PTP with respect to the cursor origin point OP. Specifically, the cursor Cr is located on a position that a straight line going toward the present touch point PTP from the cursor origin point OP is extended to with a predetermined ratio, e.g. on a point that a ratio of a distance from the cursor origin point OP to the present touch point PTP and a distance from the present touch point PTP to the cursor Cr becomes 3:4. The ratio quoted here is only an example and may be changed suitably.

By thus displaying the cursor Cr at the position that a straight line that goes toward the present touch point PTP from the cursor origin point OP is extended with a predetermined ratio, the object located near the upper end of the touch screen TS can be easily (without forcibly stretching the thumb) selected.

Then, if the specific slide operation is ended (a fingertip is released from the touch screen TS) in a state where the cursor Cr hits any one object Ob, the CPU 24 determines that the application related to the object Ob is selected, and starts a program (58) corresponding to this application.

Therefore, since a desired user interface function (for example, cursor function) can be selected and an application can be further selected using the user interface function by a single specific slide operation, a GUI suitable to a one-hand operation can be realized. Especially, since the cursor Cr moves largely according to a motion of a fingertip when a "cursor" function is selected, it is possible to easily select an object Ob near a screen upper end.

Although illustration is omitted, when the function icon FI selected by the specific slide operation is the "voice input" icon, a voice input function is started, and a user can select a desired application by performing a voice input of a name of the application. Furthermore, when the function icon FI that is selected by the specific slide operation is the "loupe" icon, a loupe function is started, and a periphery of the present touch point PTP, for example is displayed while being enlarged. Accordingly, the user can select an application easily by continuing the specific slide operation even if the objects Ob are small and crowded.

Furthermore, as a modification, the function icon FI can be displayed not only on a screen that the object Ob such as an icon and a widget is displayed but on a Web screen when performing the specific slide operation is performed. For example, it is possible to perform the control to display the "loupe" icon on a Web screen after starting a browser application using the cursor function or the voice input function.

Furthermore, although the three (3) function icons FI in the touch screen TS are the "voice input", the "cursor" and the "loupe" in the above-mentioned example, not limited to this. For example, by selecting the function icon FI by the specific slide operation, a notification bar that is hard to confirm in a one-hand operation may be displayed. Furthermore, it is possible to perform the control to start a secret application that the user does not want to display an icon thereof on the home screen by performing the specific slide operation to display the function icon FI that is not usually displayed on a launcher screen and to select the function icon FI. Furthermore, the function icon FI that is displayed by the specific slide operation may be set (changed) by the user.

Furthermore, as shown in FIG. 5(A) and FIG. 5(B), the display position of the function icon FI is changed according to the position of the start point SP of the specific slide operation. For example, if the position of the start point SP is close to the top, the display position of the function icon FI is also close to the top. On the other hand, a relationship between the position of the start point SP and the display position of the function icon FI is fixed (however, may be changed suitably).

Furthermore, as shown in FIG. 6, the protrusion Pr that arises in the end portion of the screen according to the specific slide operation may be deformed according to the direction of the specific slide operation. In the illustrated example, since the specific slide operation goes below diagonally, the protrusion Pr droops downward at a tip end side thereof.

Furthermore, as shown in FIG. 7, when the specific slide operation with the start point SP in the left end portion of the touch screen TS is performed by the thumb of the left hand while holding the mobile terminal 10 vertically with the left hand, GUI control similar to the GUI control described in FIG. 3-FIG. 6 is performed except for that right and left interchange.

Furthermore, as shown in FIG. 8, when the specific slide operation with the start point SP in the right end portion of the touch screen TS is performed by the thumb of the right hand while holding the mobile terminal 10 horizontally with the right hand, GUI control similar to the GUI control described in FIG. 3-FIG. 6 is also performed. However, since an aspect ratio of the touch screen TS changes, the threshold value compared with the displacement amount in the X direction, arrangement of the function icons FI with respect to the start point SP, etc. differ from those of a case of vertically holding (for example, elongated in the horizontal direction).

Furthermore, although illustration is omitted, when the specific slide operation is performed while holding the mobile terminal 10 horizontally with the left hand, except for a point that right and left interchange, GUI control similar to the above-mentioned case of horizontally holding with the right hand is performed.

Figures 9, 10:
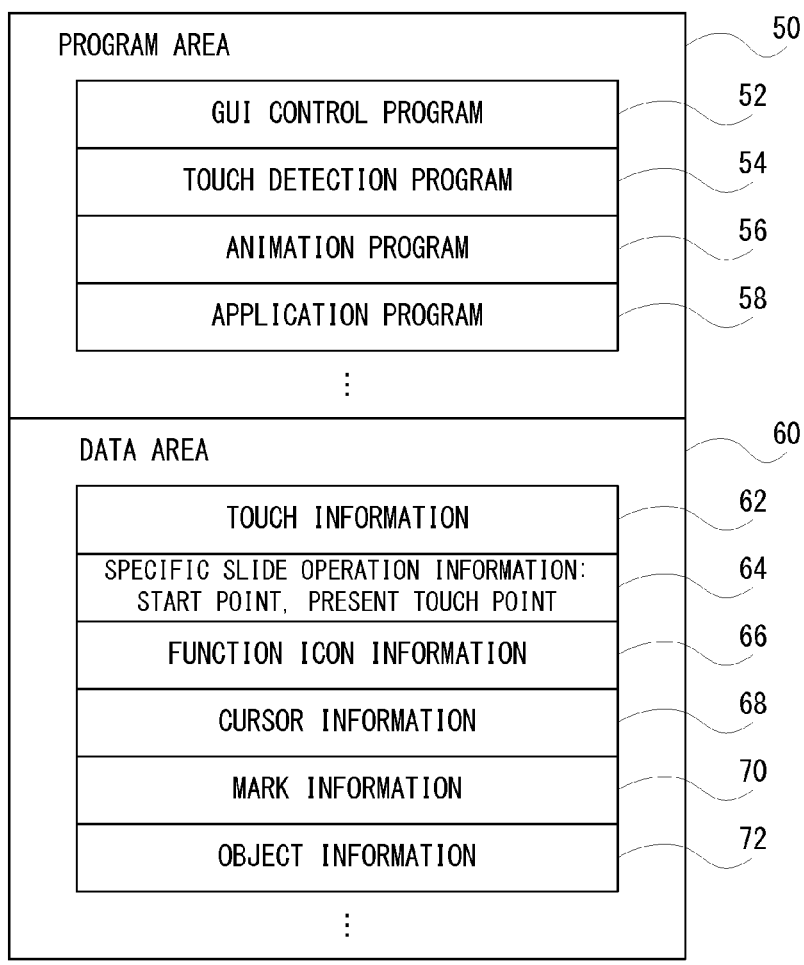
FIG. 9 is a memory map showing contents of a main memory of the mobile terminal.
FIG. 10 is an illustration view showing an example of function icon information stored in the main memory.
Figure 11:
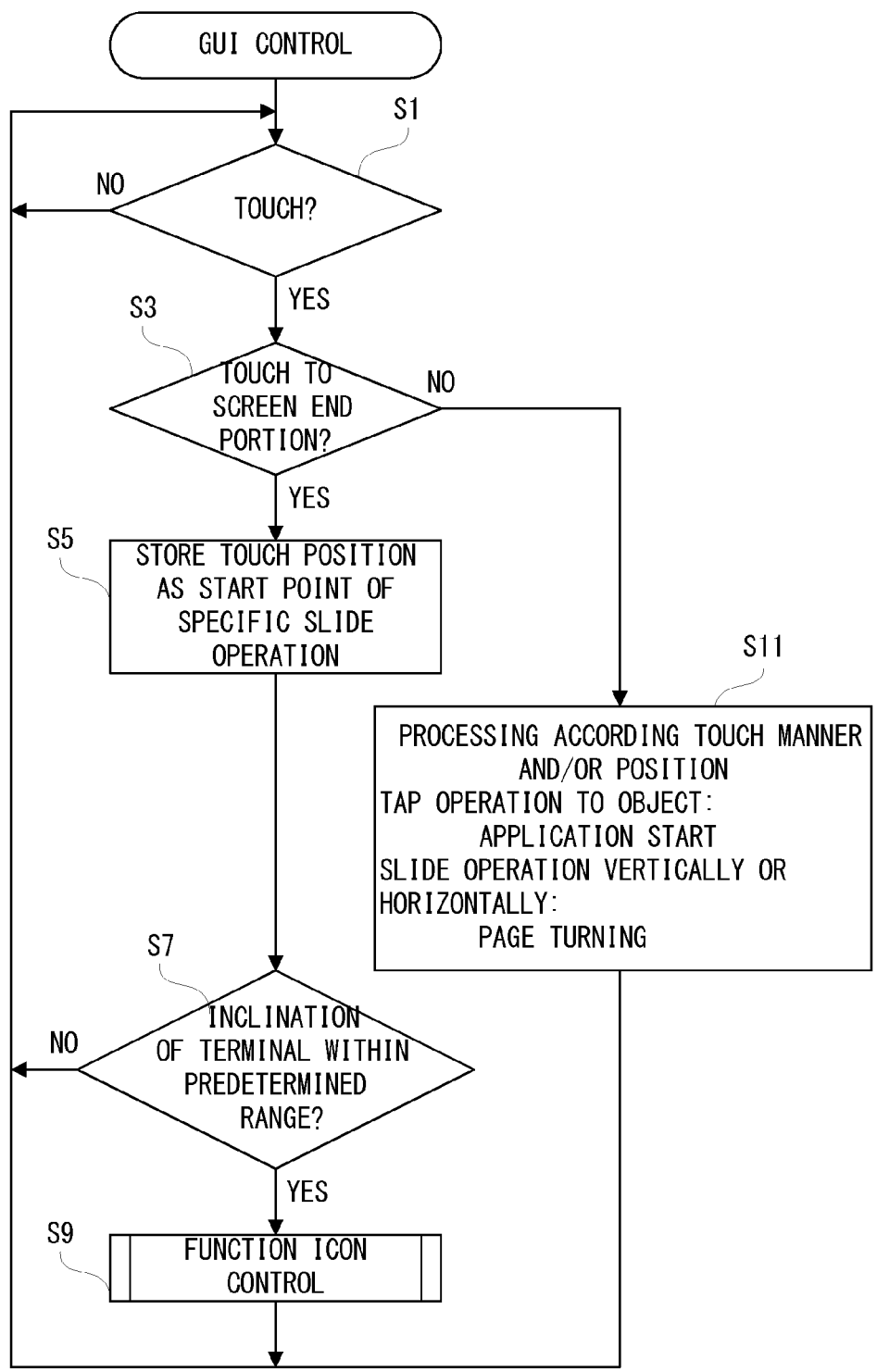
FIG. 11 is a flowchart showing GUI control processing by a CPU.
Figure 12:
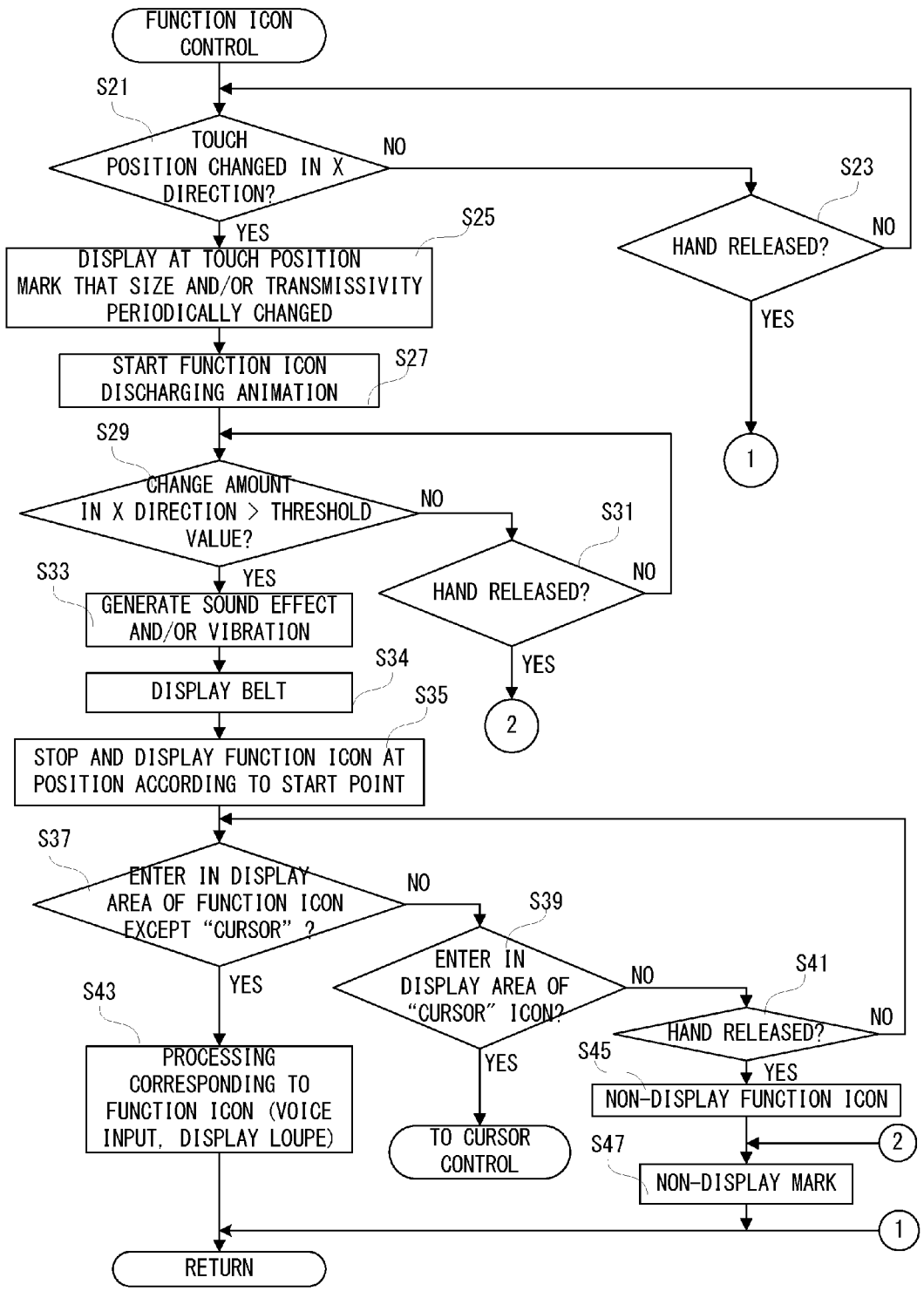
FIG. 12 is a flowchart showing details of function icon control processing included in the GUI control processing.
Figure 13:
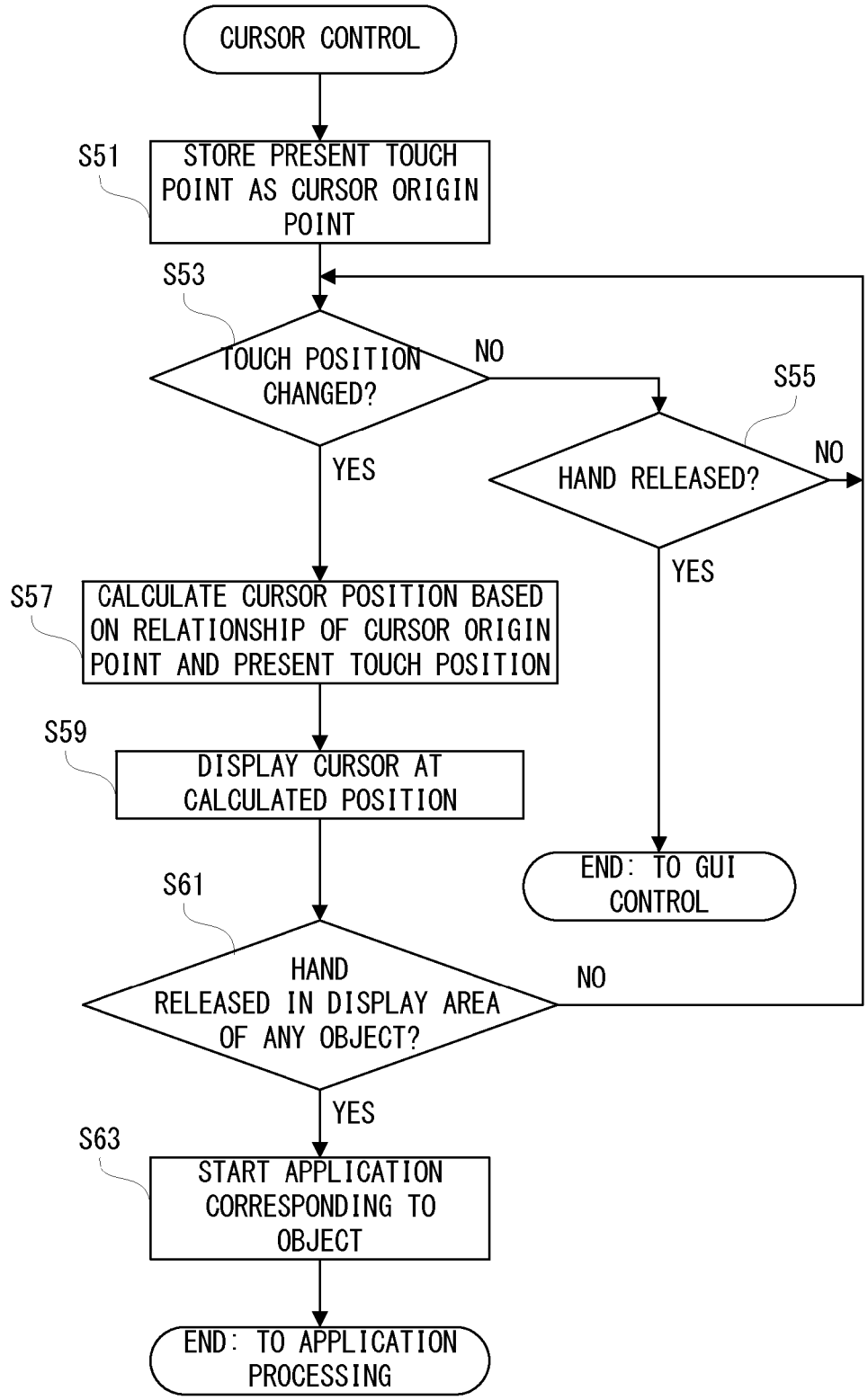
FIG. 13 is a flowchart showing cursor control processing performed when a "cursor" icon is selected in the function icon control processing.

The above-mentioned GUI control can be implemented by performing with the CPU 24 processing according to flowcharts shown in FIG. 11-FIG. 13 based on various kinds of programs (52-58) and data (62-72) that are stored in the main memory 34 and shown in FIG. 9 and FIG. 10, for example.

With reference to FIG. 9, structure of the main memory 34 will be described. The main memory 34 includes a program area 50 and a data area 60. In the program area 50, a GUI control program 52, a touch detection program 54, an animation program 56, an application program 58, etc. are stored. In the data area 60, touch information 62, specific slide operation information 64, function icon information 66, cursor information 68, a mark position 70, object information 72, etc. are stored.

The GUI control program 52 is a main program for performing GUI control (FIG. 3-FIG. 8) using the specific slide operation, and makes, in cooperation with the touch detection program 54 and the animation program 56, the CPU 24 perform the processing according to the flowcharts of FIG. 11-FIG. 13 while referring to the data area 60.

The touch detection program 54 is a program utilized by the GUI control program 52, and makes the CPU 24 perform touch detection processing (not shown) based on an output of the touch panel 32. The animation program 56 is a program utilized by the GUI control program 52, and makes the CPU 24 perform animation processing concerning the discharge of the function icon FI from the end portion of the touch screen TS. The application program 58 makes the CPU 24 perform processing concerning various kinds of applications such as a telephone and a browser.

The touch information 62 is information indicating a result of the touch detection processing, and is updated by the touch detection program 56 with a predetermined period (at every 1/60 seconds, for example). The touch information 62 includes information indicating a touch state (for example, a state where nothing touches the display surface 30a or a state where a hand etc. touches) at present, touch coordinate at present, a manner of touch (a tap or a slide), a touch locus, etc.

The specific slide operation information 64 is position information indicating the start point SP and the present touch point PTP of the specific slide operation, and is produced by the GUI control program 54 when the specific slide operation is detected, and updated by the GUI control program 54 during continuation of the specific slide operation.

In this embodiment, that "the specific slide operation is detected" means that "when an operation of sliding from an end portion of the touch screen TS to an inner side is performed, the CPU 24 determines such an operation as the specific slide operation".

The function icon information 66 is information indicating a display position, display size, etc. of the function icon FI, and is produced based on the specific slide operation information 64. Specific examples of the function icon information 66 are shown in FIG. 10. In the function icon information 66 of FIG. 10, about three (3) kinds of function icons of the "voice input", the "cursor" and the "loupe", information indicating the display positions (center coordinates (x1, y1), (x2, y2) and (x3, y3)) and display sizes (radii R1, R2 and R3, for example) are included.

The cursor information 68 is information indicating a display position, display size, etc. of the cursor Cr, and is produced by the GUI control program 54 when the "cursor" icon that is one of the function icons FI is selected, and updated by the GUI control program 54 during continuation of the specific slide operation. The mark information 70 is information indicating a display position, display size and/or permeability coefficient and a period that changes the display size and/or the permeability coefficient of the mark M, and is produced by the GUI control program 54 when the specific slide operation is detected, and updated by the GUI control program 54 during continuation of the specific slide operation. The object information 72 is information indicating a display position, display size, etc. of the object Ob, and is produced by the application program 58.

Next, an operation of the CPU 24 based on the above-mentioned programs and data will be described with reference to FIG. 11-FIG. 13. With reference to FIG. 11, the CPU 24 at first determines based on the touch information 62, in a step S1, whether there is a touch to the touch screen TS, and if NO is determined here, the CPU 24 repeats the same determination after a predetermined wait time.

If YES is determined in the step S1, the process proceeds to a step S3, and it is determined based on the touch information 62 whether the touch is a touch to a screen end portion. If NO is determined in the step S3, the process moves to a step S11, and processing according to a manner and/or position of the touch is performed. For example, if the touch is a tap operation to the object Ob, the application program 58 is started, and if the touch is a slide operation in a vertical (Y) direction or a horizontal (X) direction, page turning is performed. Then, the process returns to the step S1.

If YES is determined in the step S3, the process proceeds to a step S5, and the position coordinate of the touch is stored as the start point SP of the specific slide operation. That is, the specific slide operation information 64 is produced in the data area 60, and the touch point that is detected in the screen end portion is written into this information as the start point SP of the specific slide operation.

Next, in a step S7, it is determined based on an output of the direction/inclination sensor 38 whether the inclination of the mobile terminal 10 (touch screen TS thereof) is within a predetermined range. Then, if YES is determined in the step S7, the process proceeds to a step S9, and returning to the step S1 after performing the function icon control that is described in FIG. 3(A)-FIG. 3(D). If NO is determined in the step S7, because a possibility of an erroneous operation is high, the process returns to the step S1 without performing the function icon control.

The function icon control of the above-mentioned step S9 is performed according to a subroutine shown in FIG. 12. At first, the CPU 24 determines based on the touch information 62, in a step S21, whether the touch position is displaced in the X direction. If NO is determined in the step S21, the process moves to a step S23, and it is further determined based on the touch information 62 whether the user releases the hand from the touch screen TS. If NO is determined also in the step S23, the process returns to the step S21, and repeating the same determination after a predetermined wait time.

If YES is determined in the step S23, since the specific slide operation being expected is not started, the process returns to an upper flow (FIG. 11).

If YES is determined in the step S21, the process proceeds to a step S25, and the mark M that the size and/or transmissivity periodically changes is displayed at a touch position based on the touch information 62 and the mark information 70 (see FIG. 3(A)). Next, the animation program 58 is called in a step S27 to start the animation processing that makes the screen end portion protrude and the function icon FI discharge from the protrusion Pr as shown in FIG. 3(A)-FIG. 3(C).

Thereafter, it is determined in a step S29 whether the displacement amount of the X direction exceeds the threshold value, and if NO is determined here, it is further determined whether the user releases the hand from the touch screen TS in a step S31. If NO is determined also in the step S31, the process returns to the step S29, and repeating the same determination after a predetermined wait time.

If YES is determined in the step S31, the process returns to the upper flow (FIG. 11) after jumping to a step S47 and non-displaying the mark M because the specific slide operation being started is not continued. Accordingly, the animation that is started previously in the step S27 is ended on the way.

If YES is determined in the step S29, the process proceeds to a step S33 to generate the sound effect from the speaker 232 and the vibration from the vibrator 40, respectively at the same time that the function icon FI is discharged from the protrusion Pr in the screen end portion. Only one of the sound effect and the vibration may be generated. At the same time, a belt Bn for making it easy to see the discharge of the function icon FI is further displayed on the touch screen TS in a step S34. The discharged function icon FI is stopped at a position according to the start point SP and displayed in a next step S35 based on the specific slide information 64 (see FIG. 3(C)-FIG. 3(D)).

Next, it is determined based on the specific slide operation information 64 and the function icon information 66, in a step S37, whether a touch position (present touch point PTP) enters in a display area of the function icons FI other than the "cursor". If NO is determined in the step S37, the process moves to a step S39, and it is further determined whether the touch position enters in the display area of the "cursor" icon. If NO is determined in the step S39, the process moves to a step S41, and it is further determined based on the touch information 62 whether the user releases the hand from the touch screen TS. If NO is determined also in the step S41, the process returns to the step S37, and repeating the same determination after a predetermined wait time.

In the step S39, instead of the determination whether the touch position enters within the display area of the "cursor" icon, it may be determined whether a touch position passes through an inside of the display area of the "cursor" icon. Preferably, in a case where the finger is moved by a predetermined distance by the specific slide operation, it may be determined whether the touch position passes through an inside of the display area of the "cursor" icon (in other words, whether a touch locus intersects the display area of the "cursor" icon, and more specifically, whether the touch locus intersects perpendicularly or approximately perpendicularly a contour line of the display area of the "cursor" icon).

If YES is determined in the step S37, the process proceeds to a step S43, and the processing corresponding to the function icon FI, e.g. processing of a voice input, a loupe display, etc. is performed. Then, the process returns to the upper flow (FIG. 11), and repeating the same processing. If YES is determined in the step S41, since the specific slide operation is ended without selecting any function icon FI, the process returns to the upper flow (FIG. 11), and repeating the same processing after the function icon FI is non-displayed in a step S45 and also the mark M is non-displayed in a step S47. Then, if YES is determined in the step S39, the processing of CPU 24 shifts to the cursor control shown in FIG. 13.

With reference to FIG. 13, at first, the CPU 24 stores a touch position at a timing that a determination result in the step S39 changes from NO to YES, that is, the present touch point PTP shown in FIG. 4(A) as a cursor origin point OP (PTP to OP) in a step S51. Next, it is determined, in a step S53, whether the touch position changes, and if NO is determined here, the process moves to a step S55, and it is determined whether the user releases the hand from the touch screen TS. If NO is determined also in the step S55, the process returns to the step S53, and repeating the same determination after a predetermined wait time.

If YES is determined in the step S55, this cursor control is terminated and the GUI control (FIG. 11) is started again. If YES is determined in the step S53, after calculating a position of the cursor Cr in a step S57 based on a positional relationship between the cursor origin point OP and the present touch point PTP, the cursor Cr is displayed on this calculated position in a step S59. Specifically, a position that a straight line that goes toward the present touch point PTP from the cursor origin point OP is extended by a predetermined ratio (for example, a position that a ratio of a distance from the cursor origin point OP to the present touch point PTP and a distance from the present touch point PTP to the cursor Cr becomes at 3:4) is calculated as a cursor position, and the cursor Cr is displayed at this calculated position. A calculation method recited here is only an example, and may be changed suitably.

Then, the process proceeds to a step S61, and it is further determined based on the object information 72 and the touch information 62 whether the user releases the hand from the touch screen TS within a display area of any one of the objects Ob. If NO is determined in the step S61, the process returns to the step S53, and repeating the same determination. If YES is determined in the step S61, the process proceeds to a step S63, and the application program 58 corresponding to the object Ob is called and the selected application is started. Then, this cursor control is terminated and the application processing based on the application program 58 is started.

As clearly understood from the above, in this embodiment, the mobile terminal 10 has the touch screen TS that can display the object Ob such as an icon and a widget. When a sliding operation to an inner side of the touch screen TS from an end portion of the touch screen TS is performed, the CPU 24 of the mobile terminal 10 determines (S1, S3, S21) that such an operation is the specific slide operation, and corresponding to the determination of the specific slide operation, displays (S27, S35) the function icon FI related to the user interface function in an area that can be touched by the specific slide operation to the touch screen afterward.

Therefore, in response to the specific slide operation (FIG. 2) having the start point SP in the end portion (screen end portion) of the touch screen TS, the function icon FI is displayed in the area that can be touched by the specific slide operation afterward, in other word, in the direction that it is predicted that the present touch point PTP of the specific slide operation advances (this may be simply called "direction of the specific slide operation") (FIG. 3(A)-FIG. 3(D)), and therefore, it is possible to easily perform a one-hand operation. Furthermore, the function icon FI is displayed only after the specific slide operation, and thus, rarely disturbs the visibility of the background such as wallpaper Wp etc. The area that can be touched in the specific slide operation afterward may be the belt (Bn) or a part thereof, for example.

Furthermore, the CPU 24 displays the function icon FI in a position that differs according to the start point SP of the specific slide operation. Accordingly, it is possible to easily perform an operation with a single hand regardless of a holding position of the mobile terminal 10, more specifically, a position of the thumb of a holding hand against the touch screen TS.

Furthermore, the CPU 24 displays the function icon FI diagonally below the start point SP of the specific slide operation. Accordingly, it is possible to smoothly select the function icon FI with the thumb of the hand that holds the mobile terminal 10 by performing the specific slide operation with a center at the root of the thumb (that is, screen corner) or its periphery.

Furthermore, the CPU 24 displays a plurality of function icons FI diagonally below the start point SP of the specific slide operation along the line segment L that intersects the locus of the specific slide operation. Although the line segment L is a part of a circumference centering on the start point SP of the specific slide operation or the point of that neighborhood in this embodiment, in other embodiments, the line segment L may be a part of a curved line other than the circumference or a part of a straight line. Accordingly, since the plurality of function icons FI are located in a line in the direction intersecting the direction of the specific slide operation (preferably, intersecting perpendicularly), an arbitrary one can be easily selected from the plurality of function icons FI by the specific slide operation.

Furthermore, the CPU 24 further displays (S34) on the touch screen TS a belt Bn that has the same or approximately the same width (width a little large, here) as the length of the line segment L, along the locus of the specific slide operation in response to the detection of the specific slide operation. By thus displaying the belt Bn, it is possible to make the user perform easily the specific slide operation for selecting the function icon FI. Although the belt Bn is displayed translucently in this embodiment so as to make the background be in sight through the belt Bn, but in other embodiments, instead of the translucent display, a shading display or a line drawing display may be adopted.

Furthermore, the CPU 24 further displays (S27) on the touch screen TS an animation showing that a periphery of the start point SP in the screen end portion is protruded temporarily and the function icon FI is discharged from the protrusion Pr of the end portion according to the displacement amount dX of the horizontal direction of the specific slide operation. By thus displaying the animation to direct just like the function icon FI is discharged from the screen end portion, it is possible to give a comfortable operation feeling. Even if the above-mentioned animation is not displayed, according to the displacement amount dX of the horizontal direction of specific slide operation, the function icon FI may be displayed immediately along the line segment L that intersects the locus of the specific slide operation.

Here, the timing that the function icon FI is discharged is a timing (S29: YES) that the displacement amount dX of displacement of the horizontal direction of the specific slide operation exceeds the threshold value. Accordingly, it is possible to give a feeling just like the function icon FI is withdrawn from the screen end portion by the specific slide operation.

Furthermore, the CPU 24 further displays (S25) on the touch screen TS the mark M that is indicative of the present touch position PTP of the specific slide operation. By thus displaying the mark M to express the present touch position PTP clearly, when selecting the function icon FI or when selecting the object Ob using the cursor Cr, an erroneous operation can be reduced.

Preferably, the mark M changes periodically in at least one of the display size and the transmissivity. Accordingly, it is possible to suppress that the background becomes hard to be in sight due to the mark M.

Furthermore, the mobile terminal 10 further may comprise the speaker 22 and the vibrator 40, and the CPU 24 generates (S33) the sound effect from the speaker 22 and the vibration from the vibrator 40 at the timing that the function icon FI is discharged. By thus generating the sound effect and the vibration according to the discharge of the function icon FI, a more comfortable operation feeling can be given. Even if either the sound effect or the vibration is generated, the comfort at the time of operation improves.

Furthermore, the CPU 24 starts (S37, S39, S43, S59) the interface function related to the function icon FI when the present touch position PTP of the specific slide operation enters in the display area of the function icon FI. Otherwise, when the present touch position PTP of the specific slide operation passes through the inside of the display area of the function icon FI, the interface function related to the function icon FI may be started. Therefore, a desired interface function can be started by continuation of the specific slide operation.

For example, one function icon FI is related to the cursor function that displays on the touch screen TS the cursor Cr that moves according to the present touch position PTP of the specific slide operation, and the CPU 24 starts (S39: YES to S59) the cursor function when the present touch position PTP of the specific slide operation enters into the display area of this function icon FI. Therefore, by means of the specific slide operation, it is possible to start the cursor function that is one of the interface functions and move the cursor Cr while continuing the specific slide operation (without releasing the hand from the touch screen TS).

Furthermore, the object that is displayed on the touch screen TS is related to the application program 58, and in a case where the cursor function is started as mentioned above, the CPU 24 starts (S63) the application program 58 related to the object Ob when the specific slide operation is ended in a state where the cursor Cr enters in the display area of the object Ob. Therefore, by starting the cursor function by the specific slide operation, and by moving the cursor Cr to the object Ob corresponding to a desired application while continuing the specific slide operation, the application can be started. That is, since it is possible to perform by a single specific slide operation the starting of the cursor function by function icon selection and then the starting of the application by the object selection using the cursor Cr, a one-hand operation becomes more comfortable.

Here, the initial display position of the cursor Cr is a touch position at the timing that the cursor function is started, and then, the display position of the cursor Cr changes according to the distance from the cursor origin point OP to the present touch position PTP. Thus, the cursor Cr is initially displayed on the cursor origin point OP that is a touch position at the timing that the cursor function is started, and then, moves according to the change of the present touch position PTP, and therefore, it is possible to smoothly shift from the function icon selection for the starting of the cursor function to the object selection using the cursor Cr.

Furthermore, the display position of the cursor Cr exists in a direction that goes toward the present touch position PTP from the cursor origin point OP. Therefore, the cursor Cr can be moved toward a desired direction easily. Then, especially a moving distance of the cursor Cr is larger than a moving distance from the cursor origin point OP to the present touch position PTP. Therefore, since the cursor Cr can be largely moved with the smaller operation amount, a one-hand operation becomes much more comfortable.

Furthermore, the mobile terminal 10 further comprises the direction/inclination sensor 38, and the CPU 24 does not perform the display of the icon when the output value concerning the inclination (for example, an inclination angle of the touch screen TS to the horizontal surface) does not exist within the predetermined range. Accordingly, it is possible to avoid an erroneous operation of the icon selection that is easy to happen in a state where the touch screen TS is in horizontal or near.

The number of the icons and arrangement specifically recited in this specification are mere examples and can be changed suitably according to change of the specification of products etc.

Although the mobile terminal 10 is mentioned above, this embodiment can be applied to a mobile terminal (for example, a smartphone, a tablet PC, various kinds of information terminals) having a touch screen (what provided with a touch device such as a touch panel, a touch screen etc. on the display surface of the display) that can display an object such as an icon and a widget, and a user interface control program executed by the processor (CPU) of such a mobile terminal.

Here, reference numerals inside the parentheses, the supplements, etc. indicate corresponding relationships with the embodiments mentioned above for help of understanding, and do not limit the embodiments.

A first embodying form is a mobile terminal (10), comprising: a touch screen (TS) capable of displaying an object (Ob); a determination module (S1, S3, S21) operable to determine, when an operation that is slid from an end portion of the touch screen to an inner side of the touch screen, that the operation is a specific slide operation; and an icon display module (S27, S35) operable to display corresponding to determination of the specific slide operation by the determination module an icon (FI) related to a user interface function in an area that can be touched in the specific slide operation to the touch screen afterward.

According to the first embodying form, corresponding to the specific slide operation (FIG. 2) that assumes an end portion of the touch screen (hereinafter, may be simply called "screen end portion": an end portion means an "edge", "peripheral portion", "periphery", "border", etc.) the start point (SP), the icon is displayed in the area that can be touched in the specific slide operation to the touch screen afterward (FIG. 3(A)-FIG. 3(D)), and therefore, it is possible to perform a one-hand operation easily. Furthermore, since the icon is displayed only after performing the specific slide operation, the icon rarely disturbs the visibility of the background such as wallpaper (Wp) etc. The area that can be touched in the specific slide operation afterward may be a belt (Bn) in a fifth embodying form mentioned later or its part, for example.

A second embodying form is according to the first embodying form, wherein the icon display module is operable to display the icon in a position that differs according to a start point (SP) of the specific slide operation.

According to the second embodying form, it is possible to easily perform a one-hand operation regardless a holding position of the mobile terminal, more specifically, a position of the thumb of a holding hand to the touch screen.

A third embodying form is according to the first or second embodying form, wherein the icon display module is operable to display the icon diagonally below a start point (SP) of the specific slide operation.

According to the third embodying form, it is possible to smoothly select an icon by performing the specific slide operation with the thumb of the hand that holds the mobile terminal in a manner that a fingertip is turned with a center at a root of the thumb (that is, screen corner) or its circumference.

A fourth embodying form is according to the third embodying form, wherein the icon display module is operable to display a plurality of icons diagonally below the start point (SP) of the specific slide operation along a line segment (L) that intersects a locus of the specific slide operation.

Although the line segment is a part of a circumference centering on the start point (SP) of the specific slide operation or the point of that neighborhood in a certain embodiment, in other embodiments, may be a part of a curved line other than the circumference or a part of a straight line.

According to the fourth embodying form, since a plurality of icons are located in a line in the direction intersecting the direction of the specific slide operation (preferably, intersecting perpendicularly), an arbitrary one can be easily selected from the plurality of icons by the specific slide operation.

A fifth embodying form is according to the fourth embodying form, and further comprises a belt display module (S34) operable to display on the touch screen a belt (Bn) that has the same or approximately the same width as the length of the line segment along the locus of the specific slide operation corresponding to the detection of the specific slide operation by the determination module.

According to the fifth embodying form, it is possible to make the user easily perform the specific slide operation for selecting an icon by displaying the belt.

The belt is displayed translucently so as to make the background be in sight through the same in a certain embodiment. In other embodiments, instead of the translucent display, a shading display or a line drawing display may be sufficient.

A sixth manner is according to any one of the first to fifth embodying forms, wherein the icon display module is operable to display an animation showing that a periphery of the start point in the screen end portion is protruded temporarily and the icon is discharged from the protrusion (Pr) of the end portion according to a displacement amount (dX) in a horizontal direction of the specific slide operation.

According to the sixth embodying form, by displaying the animation to direct just like the icon is discharged from the screen end portion, it is possible to give a comfortable operation feeling.

A seventh embodying form is according to the sixth embodying form, wherein a timing that the icon is discharged is a timing (S29: YES) that a displacement amount (dX) in a horizontal direction of the slide operation exceeds a threshold value.

According to the seventh embodying form, it is possible to give a feeling just like the icon is withdrawn from the screen end portion by the specific slide operation.

An eighth embodying form is according to the seventh embodying form, and further comprises a mark display module (S25) operable to display on the touch screen a mark (M) that is indicative of a present touch position (PTP) of the specific slide operation.

According to the eighth embodying form, by displaying the mark to express the present touch position clearly, when selecting a function icon FI (or also when selecting an object Ob using the cursor Cr mentioned later) an erroneous operation can be reduced.

A ninth embodying form is according to the eighth embodying form, wherein the mark is periodically changes in at least one of a display size and transmissivity.

According to the ninth embodying form, it is possible to suppress that the background becomes hard to be in sight due to the mark.

A tenth embodying form is according to any one of the seventh to ninth embodying forms, and further comprises at least one of a speaker (22) and a vibrator (40), and a generating module (S33) operable to generate at least one of a sound from the speaker and vibration from the vibrator.

According to the tenth embodying form, by generating the sound and/or the vibration according to the discharge of the icon, a more comfortable operation feeling can be given.

An eleventh embodying form is according to any one of the first to tenth embodying forms, and further comprises a starting module (S37, S39, S43, S59) operable to start an interface function related to an icon when a present touch position (PTP) of the specific slide operation enters in a display area of the icon.

A twelfth embodying form is according to any one of the first to tenth embodying forms, and further comprises a starting module (S37, S39, S43, S59) operable to start an interface function related to an icon when a present touch position (PTP) of the specific slide operation passes a display area of the icon.

In a certain embodiment, if a locus of the present touch position PTP intersects the display area of the function icon FI when the finger is moved by a predetermined distance by the specific slide operation, the interface function related to the function icon FI is started. In other embodiments, if the locus of the present touch position PTP intersects a contour line of the display area of the function icon Fl perpendicularly or approximately perpendicularly, the interface function related to the function icon FI is started.

According to the eleventh or twelfth embodying form, it is possible to start a desired interface function by continuation of the specific slide operation.

A thirteenth embodying form is according to the eleventh embodying form, wherein an icon is related to a cursor function that displays on the touch screen a cursor (Cr) that moves according to the present touch position of the specific slide operation, and the starting module is operable to start the cursor function (S39: YES to S59) when the present touch position of the specific slide operation enters into the display area of the icon.

The starting module may start the cursor function when the present touch position of the specific slide operation passes through the display area of the icon as recited in the twelfth embodying form.

According to the thirteenth embodying form, by means of the specific slide operation, the cursor function that is one of the interface functions is started, and then, the cursor can be moved by continuing the specific slide operation (without releasing the hand from the touch screen).

A fourteenth embodying form is according to the thirteenth embodying form, wherein an object is related to an application (58), and further comprises an application starting module (S63) operable to start the application related to the object if the cursor function is started by the starting module and the specific slide operation is ended in a state where the cursor enters in the display area of the object.

According to the fourteenth embodying form, by starting the cursor function by the specific slide operation, and by moving the cursor to the object corresponding to a desired application while continuing the specific slide operation, the application can be started. That is, since it is possible to perform by a single specific slide operation the starting of the cursor function by function icon selection and then the starting of the application by the object selection using the cursor, a one-hand operation becomes more comfortable.

A fifteenth embodying form is according to the thirteenth or fourteen embodying form, wherein an initial display position of the cursor is a touch position (OP) at a timing that the cursor function is started, and then, the display position of the cursor changes according to a distance from the touch position at the timing that the cursor function is started to the present touch position (PTP).

According to the fifteenth embodying form, the cursor is initially displayed on the touch position at the timing that the cursor function is started, and then, moves according to the change of the present touch position, and therefore, it is possible to smoothly shift from the function icon selection for starting the cursor function to the object selection using the cursor.

A sixteenth embodying form is according to the fifteenth embodying form, wherein the display position of the cursor exists in a direction that goes toward the present touch position (PTP) from the touch position (OP) at the timing that the cursor function is started.

According to the sixteenth embodying form, the cursor can be moved toward a desired direction easily.

A seventeenth embodying form is according to the sixteenth embodying form, wherein a moving distance of the cursor is larger than a moving distance from the position at the timing that the cursor function is started (OP) to the present touch position (PTP).

According to the seventeenth embodying form, since the cursor can be largely moved with the smaller operation amount, a one-hand operation becomes much more comfortable.

An eighteenth embodying form is according to the first embodying form, and further comprises a sensor (38) operable to detect at least an inclination of the touch screen to a horizontal surface, wherein the icon display module is operable not to perform icon display when an inclination value detected by the sensor does not exist within a predetermined range.

According to the eighteenth embodying form, it is possible to avoid an erroneous operation of the icon selection that is easy to happen in a state where the touch screen TS is in horizontal or near.

A nineteenth embodying form is a user interface control program (52) that causes a processor (24) of a mobile terminal (10) having a touch screen (TS) capable of displaying an object (Ob) to function as: a determining module (S1, S3, S21) operable to determine, when an operation that is slid from an end portion of the touch screen to an inner side of the touch screen is performed, that the operation is a specific slide operation; and an icon display module (S27, S35) operable to display corresponding to determination of the specific slide operation by the determining module an icon (FI) related to a user interface function in an area that the icon can be touched by the specific slide operation to the touch screen afterward.

A twentieth embodying form is a user interface control method performed by a mobile terminal (10) having a touch screen (TS) capable of displaying an object (Ob), comprising steps of: determining (S1, S3, S21), when an operation that is slid from an end portion of the touch screen to an inner side of the touch screen is performed, that the operation is a specific slide operation; and displaying (S27, S35) corresponding to determination of the specific slide operation in the determining step an icon related to a user interface function in an area that the icon can be touched by the specific slide operation to the touch screen afterward.

According to the nineteenth or twentieth embodying form, it is possible to easily perform a one-hand operation like the first embodying form.

Although the present disclosure has been described and illustrated in detail, it is clearly understood that the same is by way of illustration and example only and is not to be taken by way of limitation, the spirit and scope of the present disclosure being limited only by the terms of the appended claims.

The invention claimed is:

1. A mobile terminal, comprising:
a touch screen capable of displaying an object;
a determination module operable to determine, when an operation of sliding from an end portion of the touch screen to an inner side of the touch screen, that the operation is a specific slide operation; and
an icon display module operable to display, in response to determination of the specific slide operation by the determination module an icon related to a user interface function in an area that can be touched in the specific slide operation afterward,
wherein the icon display module is operable to display an animation showing that a periphery of a start point in the screen end portion is protruded temporarily and the icon is discharged from a protrusion of the end portion according to a displacement amount in a horizontal direction of the specific slide operation.

2. The mobile terminal according to claim 1, wherein the icon display module is operable to display the icon in a position that differs according to a start point of the specific slide operation.

3. The mobile terminal according to claim 1, wherein the icon display module is operable to display the icon diagonally below a start point of the specific slide operation.

4. The mobile terminal according to claim 3, wherein the icon display module is operable to display a plurality of icons diagonally below the start point of the specific slide operation along a line segment that intersects a locus of the specific slide operation.

5. The mobile terminal according to claim 4, further comprising a belt display module operable to display on the touch screen a belt that has the same or approximately the same width as a length of the line segment along the locus of the specific slide operation corresponding to a detection of the specific slide operation by the determination module.

6. The mobile terminal according to claim 1, wherein a timing that the icon is discharged is a timing that the displacement amount in the horizontal direction of the slide operation exceeds a threshold value.

7. The mobile terminal according to claim 6, further comprising a mark display module operable to display on the touch screen a mark that is indicative of a present touch position of the specific slide operation.

8. The mobile terminal according to claim 7, wherein the mark periodically changes in at least one of a display size and transmissivity.

9. The mobile terminal according to claim 6, further comprising at least one of a speaker and a vibrator, and a generating module operable to generate at least one of a sound from the speaker and vibration from the vibrator at a timing that the icon is discharged.

10. The mobile terminal according to claim 1, further comprising a starting module operable to start an interface function related to an icon when a present touch position of the specific slide operation enters in a display area of the icon.

11. The mobile terminal according to claim 10, wherein the icon is related to a cursor function that displays on the touch screen a cursor that moves according to the present touch position of the specific slide operation, and the starting module is operable to start the cursor function when the present touch position of the specific slide operation enters into the display area of the icon.

12. The mobile terminal according to claim 11, wherein the object is related to an application, and further comprises an application starting module operable to start the application related to the object if the cursor function is started by the starting module and the specific slide operation is ended in a state where the cursor enters in a display area of the object.

13. The mobile terminal according to claim 11, wherein an initial display position of the cursor is a touch position at a timing that the cursor function is started, and then, the display position of the cursor changes according to a distance from the touch position at the timing that the cursor function is started to the present touch position.

14. The mobile terminal according to claim 13, wherein the display position of the cursor exists in a direction that goes toward the present touch position from the touch position at the timing that the cursor function is started.

15. The mobile terminal according to claim 14, wherein a moving distance of the cursor is larger than a moving distance from the position at the timing that the cursor function is started to the present touch position.

16. The mobile terminal according to claim 1, further comprising a starting module operable to start an interface function related to an icon when a present touch position of the specific slide operation passes a display area of the icon.

17. The mobile terminal according to claim 1, further comprising a sensor operable to detect at least an inclination of the touch screen to a horizontal surface, wherein the icon display module is operable not to perform icon display when an inclination value detected by the sensor does not exist within a predetermined range.

18. A user interface control method performed by a mobile terminal having a touch screen capable of displaying an object, comprising steps of:
determining, when an operation of sliding from an end portion of the touch screen to an inner side of the touch screen is performed, that the operation is a specific slide operation; and
displaying, in response to determination of the specific slide operation an icon related to a user interface function in an area that the icon can be touched by the specific slide operation afterward; and
displaying an animation showing that a periphery of a start point in the screen end portion is protruded temporarily and the icon is discharged from a protrusion of the end portion according to a displacement amount in a horizontal direction of the specific slide operation.

19. A mobile terminal, comprising:
a touch screen capable of displaying an object;
a determination module operable to determine, when an operation of sliding from an end portion of the touch screen to an inner side of the touch screen, that the operation is a specific slide operation;
an icon display module operable to display, in response to determination of the specific slide operation by the determination module an icon related to a user interface function in an area that can be touched in the specific slide operation afterward, wherein the icon display module is operable to display the icon diagonally below a start point of the specific slide operation, wherein the icon display module is operable to display a plurality of icons diagonally below the start point of the specific slide operation along a line segment that intersects a locus of the specific slide operation; and
a belt display module operable to display on the touch screen a belt that has the same or approximately the same width as a length of the line segment along the locus of the specific slide operation corresponding to a detection of the specific slide operation by the determination module.

* * * * *